(12) United States Patent
Jacques et al.

(10) Patent No.: US 12,273,019 B2
(45) Date of Patent: Apr. 8, 2025

(54) CONTROLLER FOR A POWER CONVERTER HAVING AN INVERTER FREQUENCY CONTROLLED BY A SWITCH CONTROL SIGNAL

(71) Applicant: REDISEM LTD., Shatin (CN)

(72) Inventors: Russell Jacques, Shatin (HK); David Coulson, Shatin (HK); Niek van der Duijn Schouten, Shatin (HK)

(73) Assignee: REDISEM LTD., Shatin (HK)

( * ) Notice: Subject to any disclaimer, the term of this patent is extended or adjusted under 35 U.S.C. 154(b) by 88 days.

(21) Appl. No.: 17/905,596

(22) PCT Filed: Mar. 4, 2020

(86) PCT No.: PCT/CN2020/077818
§ 371 (c)(1),
(2) Date: Sep. 2, 2022

(87) PCT Pub. No.: WO2021/174453
PCT Pub. Date: Sep. 10, 2021

(65) Prior Publication Data
US 2023/0113700 A1    Apr. 13, 2023

(51) Int. Cl.
*H02M 3/335* (2006.01)
*H02M 1/00* (2006.01)
(Continued)

(52) U.S. Cl.
CPC ....... *H02M 1/0058* (2021.05); *H02M 1/0009* (2021.05); *H02M 3/33507* (2013.01); *H05B 45/305* (2020.01); *H05B 47/24* (2020.01)

(58) Field of Classification Search
CPC ............ H02M 1/0009; H02M 1/0058; H02M 3/33507
See application file for complete search history.

(56) References Cited

U.S. PATENT DOCUMENTS 5,493,485 A * 2/1996 Okado .................. H02M 7/48
363/56.01
10,326,377 B1 * 6/2019 Xiong .................. H05B 45/14
(Continued)

FOREIGN PATENT DOCUMENTS

CN          1086639 A       5/1994
CN          1291415 A       4/2001
(Continued)

*Primary Examiner* — Sisay G Tiku
(74) *Attorney, Agent, or Firm* — LaMorte & Associates P.C.

(57) ABSTRACT

A controller for a power converter. The power converter comprises an inverter for receiving a supply power and providing an inverter output at an inverter frequency. There is a primary inductance for receiving the inverter output and providing a primary output. There is at least one current sensor for sensing at least one output current and providing at least one output current signal based on the at least one output current. The controller is adapted to receive the at least one output current signal, and control the inverter frequency by providing a switch control signal to the inverter based on the at least one output current signal and a reference signal thereby providing a desired primary output corresponding to the reference signal.

17 Claims, 10 Drawing Sheets

(51) Int. Cl.
*H05B 45/305* (2020.01)
*H05B 47/24* (2020.01)

(56) References Cited

U.S. PATENT DOCUMENTS

| | | | |
|---|---|---|---|
| 10,362,652 | B1 | 7/2019 | Xiong et al. |
| 10,559,974 | B1 * | 2/2020 | Porter ............... H02M 3/33523 |
| 11,206,727 | B1 * | 12/2021 | Palliyil Chundethodiyil .............. H05B 45/14 |
| 2011/0043122 | A1 * | 2/2011 | Alexandrov .......... H02M 7/538 315/246 |
| 2017/0117806 | A1 * | 4/2017 | Jacques ............... H02M 1/4258 |
| 2018/0062523 | A1 * | 3/2018 | Rainer .............. H02M 3/33507 |
| 2019/0036456 | A1 * | 1/2019 | Coulson .................. H02M 3/24 |
| 2019/0386573 | A1 * | 12/2019 | Jacques ................ H05B 45/382 |
| 2019/0394849 | A1 * | 12/2019 | Wang ...................... H05B 45/59 |
| 2021/0058000 | A1 * | 2/2021 | Ahmed ..................... H02J 7/00 |
| 2022/0029544 | A1 * | 1/2022 | Van Dijk .......... H02M 3/33571 |
| 2023/0171863 | A1 * | 6/2023 | Jacques ................ H05B 45/382 315/307 |
| 2023/0231494 | A1 * | 7/2023 | Harrison ............... H02M 1/007 363/21.02 |

FOREIGN PATENT DOCUMENTS

| | | | | |
|---|---|---|---|---|
| CN | 102474962 | A | | 5/2012 |
| CN | 101873750 | B * | 11/2013 | ......... H05B 33/0815 |
| CN | 203562972 | U | | 4/2014 |
| CN | 104270013 | A | | 1/2015 |
| CN | 106063104 | A * | 10/2016 | .............. H02M 1/14 |
| CN | 106411142 | A * | 2/2017 | |
| CN | 107995721 | A * | 5/2018 | ......... H05B 33/0821 |
| EP | 4184770 | A1 * | 5/2023 | ............. G01R 19/0092 |
| JP | H08223945 | A | | 8/1996 |
| WO | WO-2019147740 | A1 * | 8/2019 | ............. H05B 45/31 |

* cited by examiner

CONTROLLER FOR A POWER CONVERTER HAVING AN INVERTER FREQUENCY CONTROLLED BY A SWITCH CONTROL SIGNAL

TECHNICAL FIELD

The invention relates to controllers for power converters, power converters. and associated methods, including methods of controlling power converters. The invention has been described for use with or in the form of power converters adapted to drive light emitting diodes (LEDs) and LED lighting apparatus, but is not limited to this particular application.

BACKGROUND ART

Resonant switched-mode converters generally comprise one or more power-conversion stages and a control circuit (also called a "controller") which uses frequency control to achieve output regulation of output current, voltage, or power. To minimise application costs, the controller is usually powered by rectifying an auxiliary supply derived from the switched-mode converter itself. In these cases, the auxiliary supply simply reflects the load voltage, and collapses if the power delivered to the load is cut off. However, for some applications which include a standby feature (such as the Digital Addressable Lighting Interface (DALI) turn-off condition in networked dimmable LED drivers), the controller must always be powered, even when the switched-mode converter is not delivering power to the load. At present, the solution for standby-capable applications is to incorporate an extra DC-DC converter to provide the auxiliary supply, increasing the product cost, complexity, and possible points of failure.

For many controllable power converters such as dimmable LED drivers, it is desirable for the controller to work as a slave to an external master control unit (MCU) to enable deployment in networked systems. To minimise costs, the signalling interface between the controller and the MCU must be minimised yet provide sufficient features and flexibility to maximise the range of possible applications.

Many networked applications (including DALI dimmable LED drivers) require that the MCU signals a supply failure to the digital controlling network if the supply power is removed or falls below some pre-defined level. To achieve this, the MCU must be made aware of the supply failure quickly and the MCU supply maintained long enough for the MCU to signal the supply failure and shut down in an orderly way. At present, methods of implementing this require significant additional hardware, incurring extra costs, complexity, and additional points of possible failure. The supply failure is detected by additional circuitry which monitors either the supply input voltage or the main power supply (HT) voltage. The DC-DC converter (which provides the MCU power) has a large bulk capacitor to keep the MCU powered for a period after the supply failure.

To meet international electromagnetic compliance standards, power factor and harmonics emissions must be controlled within strict limits. At present, the most popular solution for off-supply converters is to add a pre-regulating power conversion stage to provide active power factor correction (APFC). Passive power factor correction (PPFC) is a lower-cost alternative which can provide EMI compliance at a lower cost, albeit within a narrower range of supply/load conditions. Typical PPFC works by using the resonant current in the power converter to boost the HT voltage. However, if the load on the power converter is a short-circuit, the PPFC can boost the HT rail to a very high voltage, potentially overstressing the HT components. Therefore, to use PPFC, the controller must have an additional safety measure to protect against abnormally low voltage loads, including short-circuit.

It is an object of the present invention to overcome or ameliorate at least one of the disadvantages of the prior art, or to provide a useful alternative.

It is an object of some embodiments of the present invention to provide a lower cost apparatus and method capable of controlling dimmable LED drivers, based on resonant power converters with PPFC in standby-capable and network-capable applications. It is an object of some embodiments of the present invention to provide a new method of detecting supply failure whilst sustaining the MCU power.

SUMMARY OF INVENTION

Technical Problem

Solution to Problem

Technical Solution

Embodiments of the present invention in a first aspect provide a controller for a power converter, the power converter comprising:

an inverter for receiving a supply power and providing an inverter output at an inverter frequency;

a primary inductance for receiving the inverter output and providing a primary output; and at least one current sensor for sensing at least one output current and providing at least one output current signal based on the at least one output current;

the controller adapted to:

receive the at least one output current signal; and control the inverter frequency by providing a switch control signal to the inverter based on the at least one output current signal and a reference signal thereby providing a desired primary output corresponding to the reference signal.

In one embodiment, the reference signal is a fixed reference signal, the desired primary output thereby being a fixed primary output.

In another embodiment, the reference signal is a variable dimming signal, the desired primary output thereby being a dimming primary output.

In one embodiment, the primary inductance is part of a resonant tank, the resonant tank receiving the inverter output and providing a resonant output as the primary output.

In one embodiment, the resonant tank has a tank current, at least one of the output currents being the tank current and at least one of the output current signals being a tank current signal based on the tank current.

In one embodiment, the controller is adapted to receive an auxiliary power supply.

In one embodiment, the power converter comprises a main winding for receiving the primary output, and a first auxiliary winding inductively coupled to the main winding, the first auxiliary winding thereby providing the auxiliary power supply.

In one embodiment, the power converter comprises a second auxiliary winding inductively coupled to the primary inductance, the second auxiliary winding thereby providing the auxiliary power supply.

In one embodiment, the controller is adapted to receive the auxiliary power supply to remain in an operating state whilst controlling the inverter frequency such that the primary output has a maximum voltage below a load turn-on voltage when the controller receives a load turn-off instruction.

In one embodiment, the controller is adapted to detect when the auxiliary power supply exceeds a maximum auxiliary supply voltage, and is adapted to enter a standby mode when the auxiliary power supply exceeds the maximum auxiliary supply voltage.

In one embodiment, the power converter comprises an output circuit for receiving the primary output, the output circuit having a secondary current, at least one of the output currents being the secondary current and at least one of the output current signals being a secondary current signal based on the secondary current.

In one embodiment, the controller is adapted to control the inverter frequency to a maximum level during an initialization period to minimize an output current when the controller receives a load turn-on instruction.

In one embodiment, the controller is adapted to increase the inverter frequency if a capacitive-mode switching condition is detected.

In one embodiment, the controller is adapted to increase the inverter frequency if an interruption to the supply power is detected.

In one embodiment, the controller is adapted to enter a burst mode if an interruption to the supply power is detected.

In one embodiment, the controller is adapted to increase the inverter frequency if an under-voltage condition is detected.

In one embodiment, the controller is adapted to enter a standby mode if an over-voltage condition is detected.

In one embodiment, the power converter has a controlled self-oscillating topology, and wherein the controller is adapted to restart normal oscillation if abnormal oscillation is detected.

In one embodiment, the power converter supplies power to a LED load.

Embodiments of the present invention in a second aspect provide a power converter comprising a controller according to any one of the embodiments described above.

Embodiments of the present invention in a third aspect provide a LED lighting apparatus having a power converter comprising a controller according to any one of the embodiments described above.

Embodiments of the present invention in a fourth aspect provide a method of controlling a power converter comprising:

an inverter for receiving a supply power and providing an inverter output at an inverter frequency;

a primary inductance for receiving the inverter output and providing a primary output; and at least one current sensor for sensing at least one output current and providing at least one output current signal based on the at least one output current;

the method comprising:

receiving the at least one output current signal; and controlling the inverter frequency by providing a switch control signal to the inverter based on the at least one output current signal and a reference signal thereby providing a desired primary output corresponding to the reference signal.

In one embodiment, the primary inductance is part of a resonant tank, the resonant tank receiving the inverter output and providing a resonant output as the primary output, the resonant tank having a tank current, at least one of the output currents being the tank current and at least one of the output current signals being a tank current signal based on the tank current.

In one embodiment, the power converter comprises an output circuit for receiving the primary output, the output circuit having a secondary current, at least one of the output currents being the secondary current and at least one of the output current signals being a secondary current signal based on the secondary current.

Other features and embodiments of the present invention can be found in the appended claims.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

Advantageous Effects of Invention

BRIEF DESCRIPTION OF DRAWINGS

Description of Drawings

Figure 1:
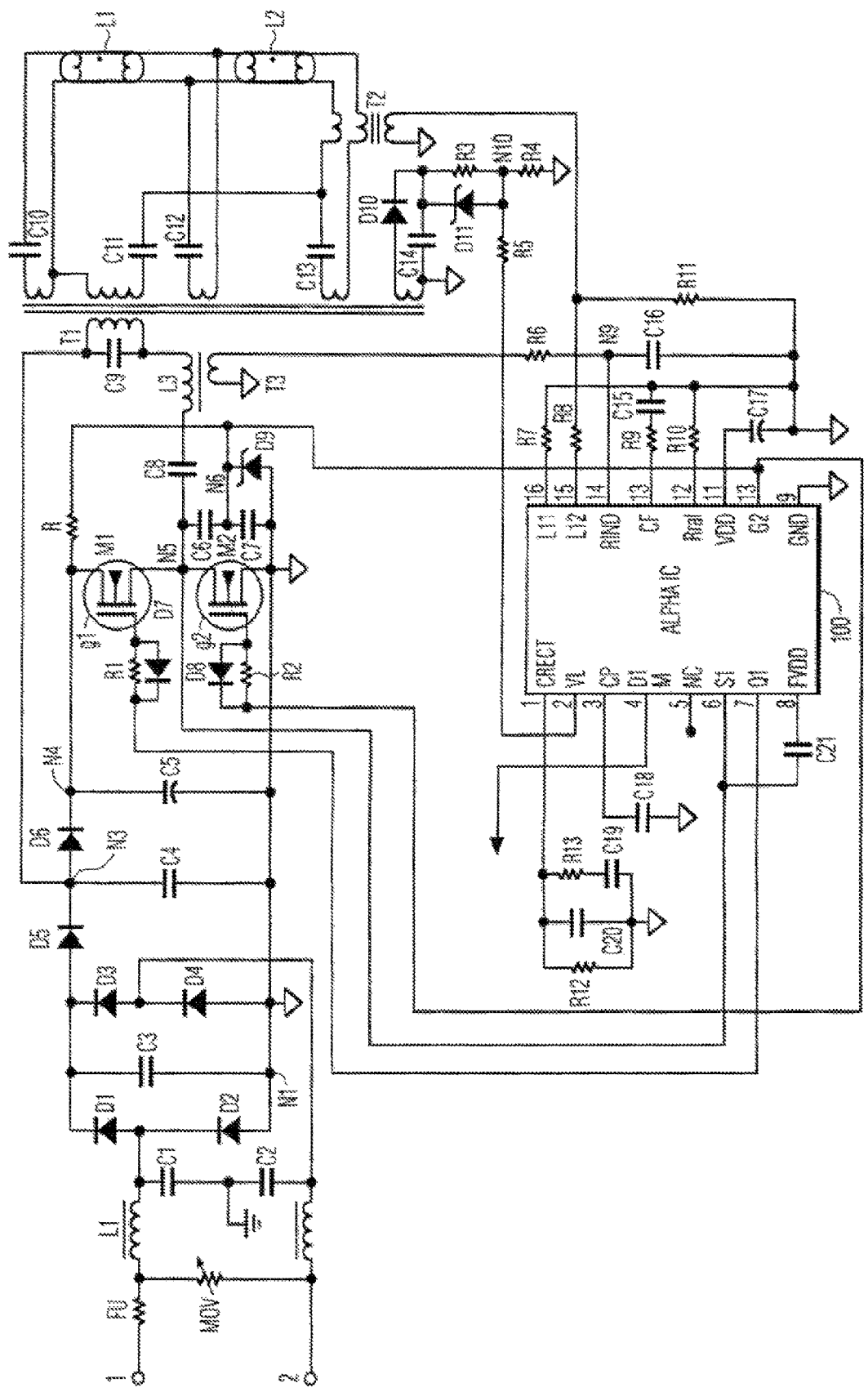

The accompanying figures include the following figures depicting the prior art:

FIG. 1 is a schematic diagram of a prior art LED driver circuit; and

Figure 2:
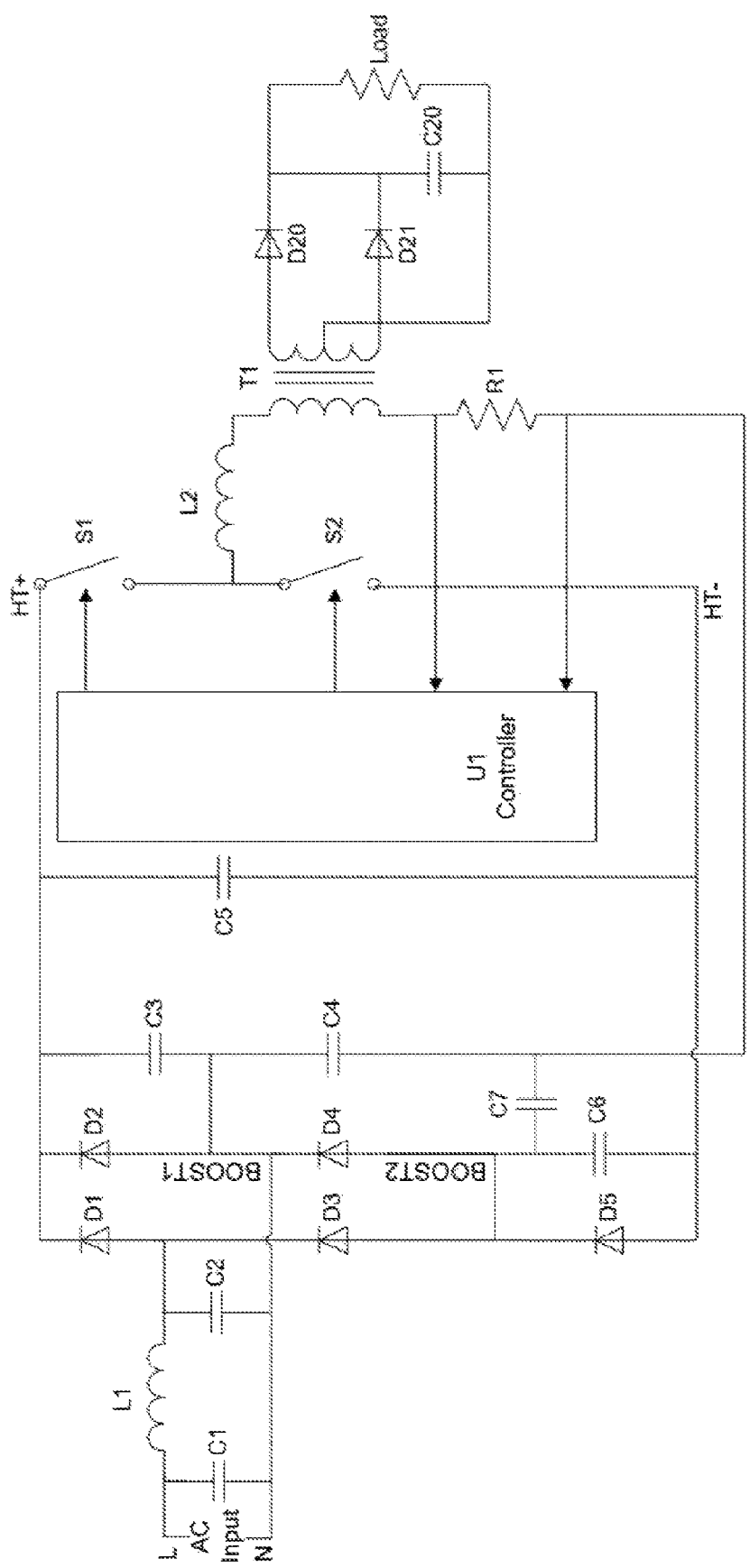

FIG. 2 is a schematic diagram of another prior art LED driver circuit.

Figure 3:
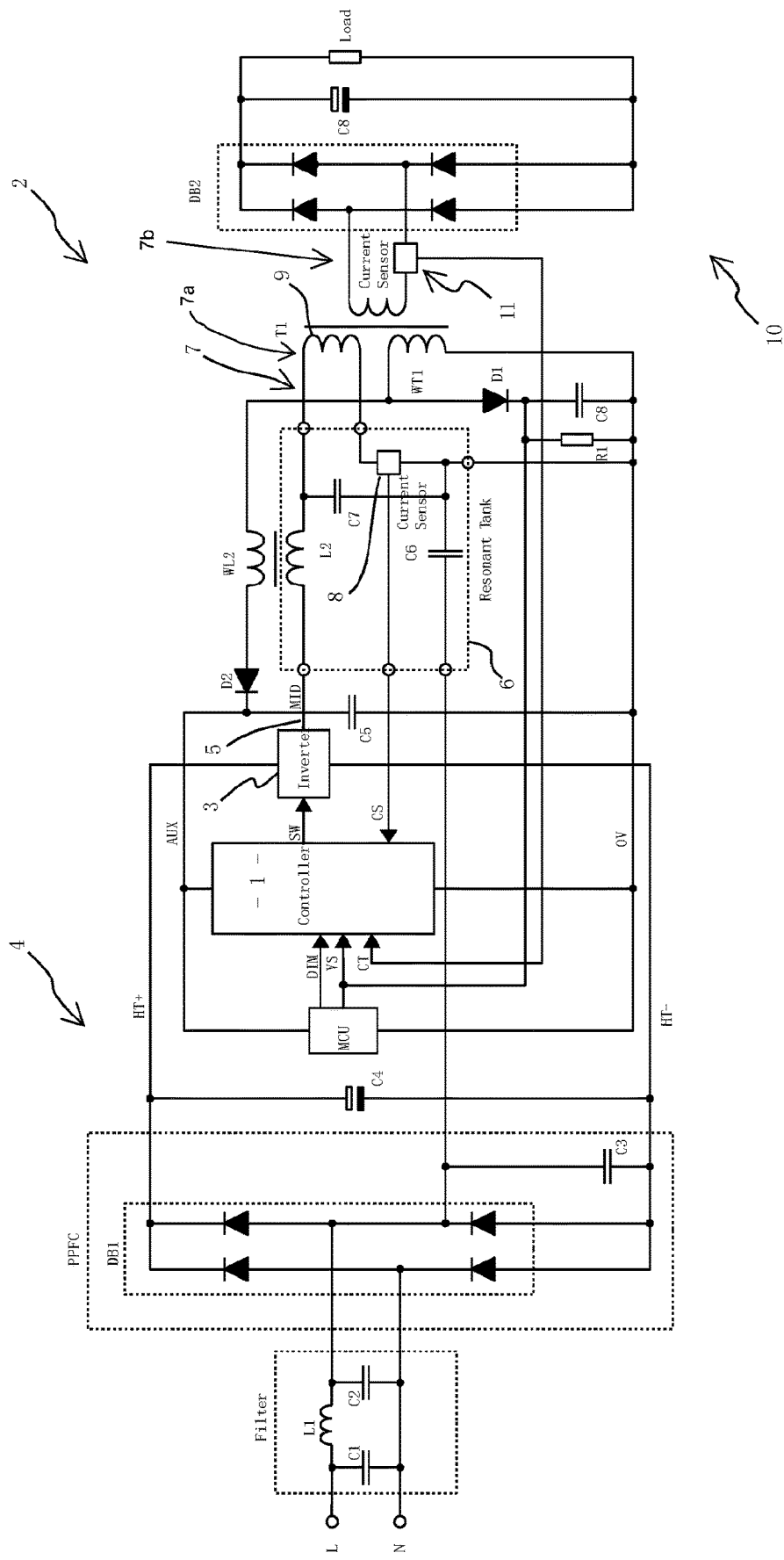
Figure 4:
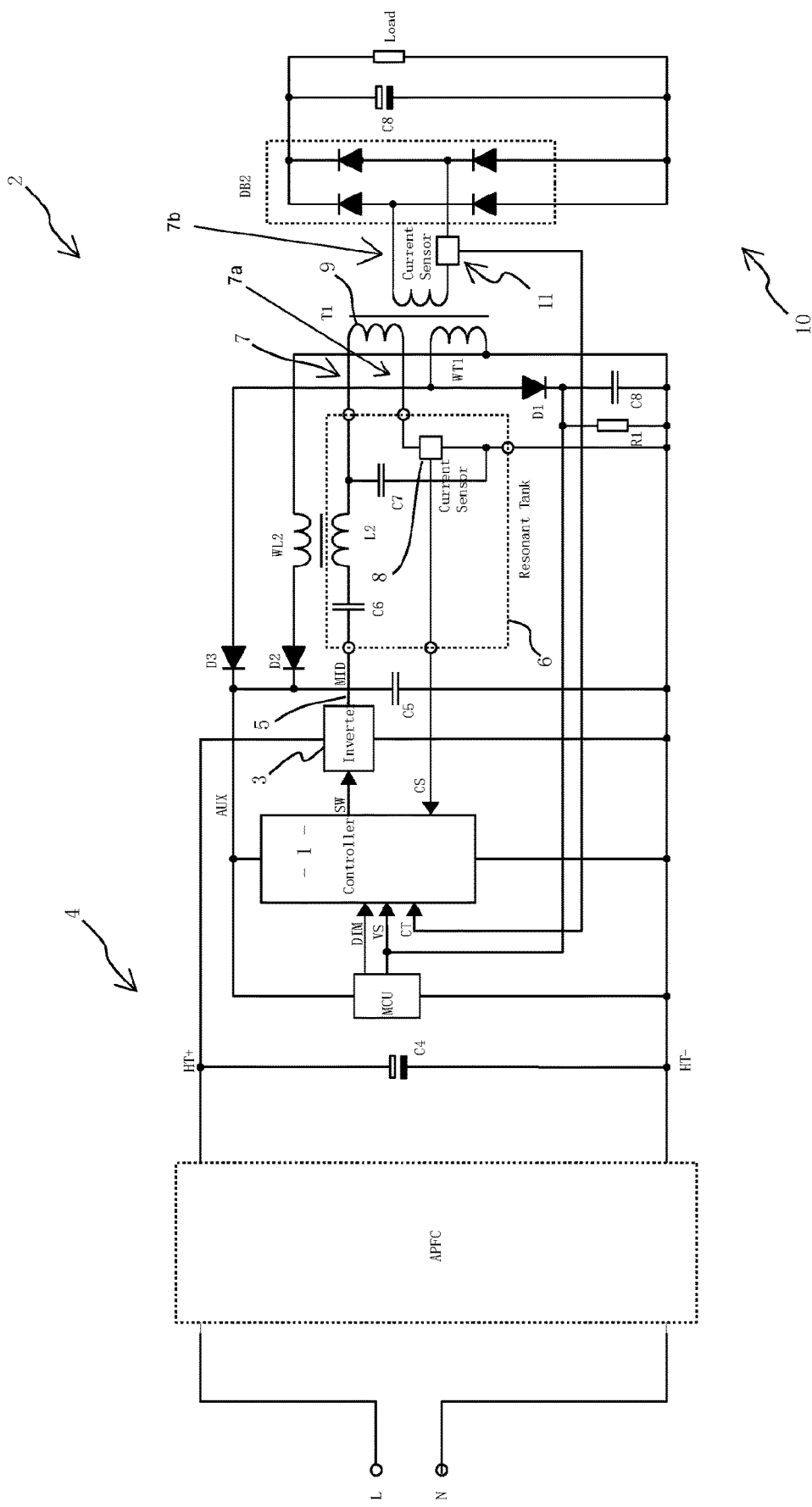
Figure 5:
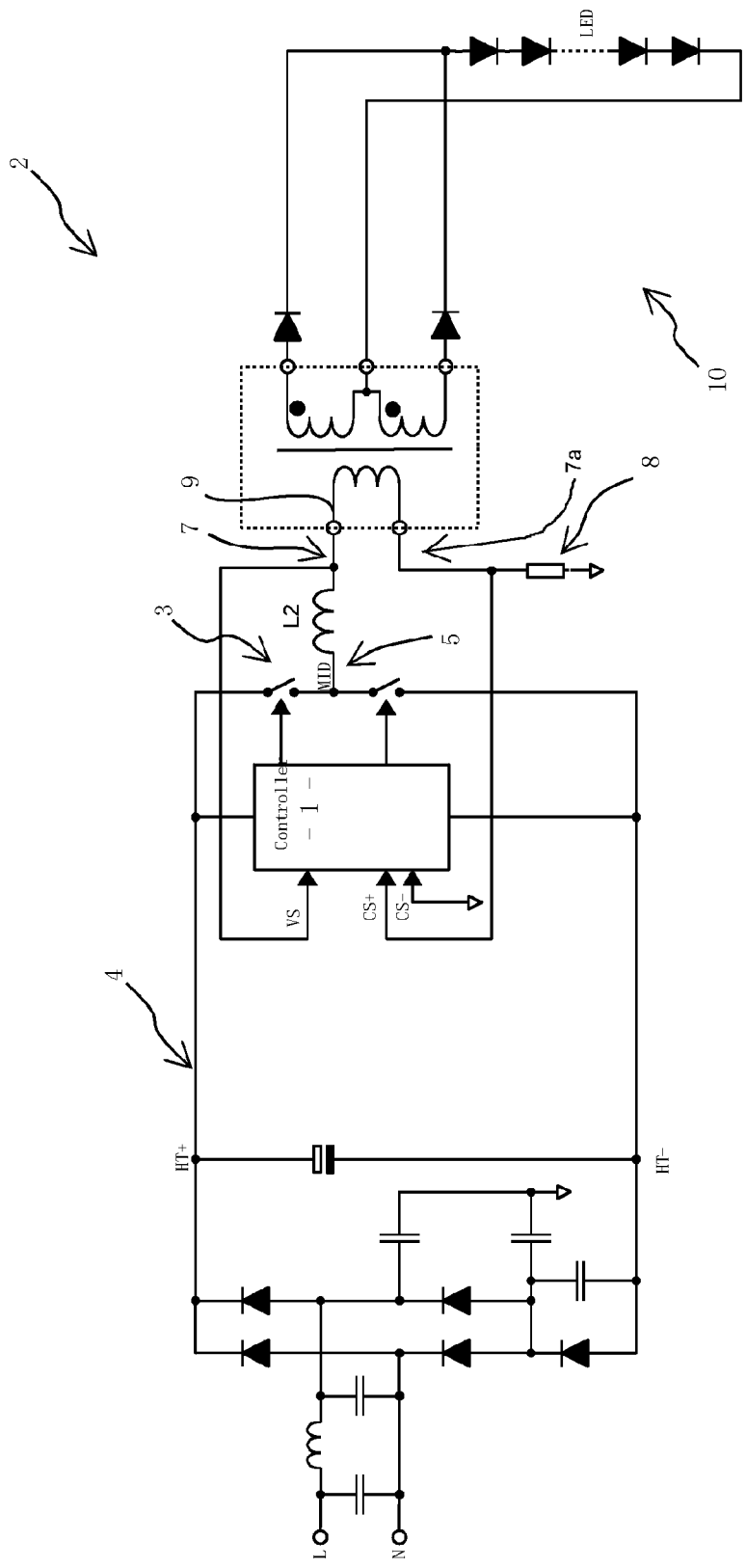
Figure 6:
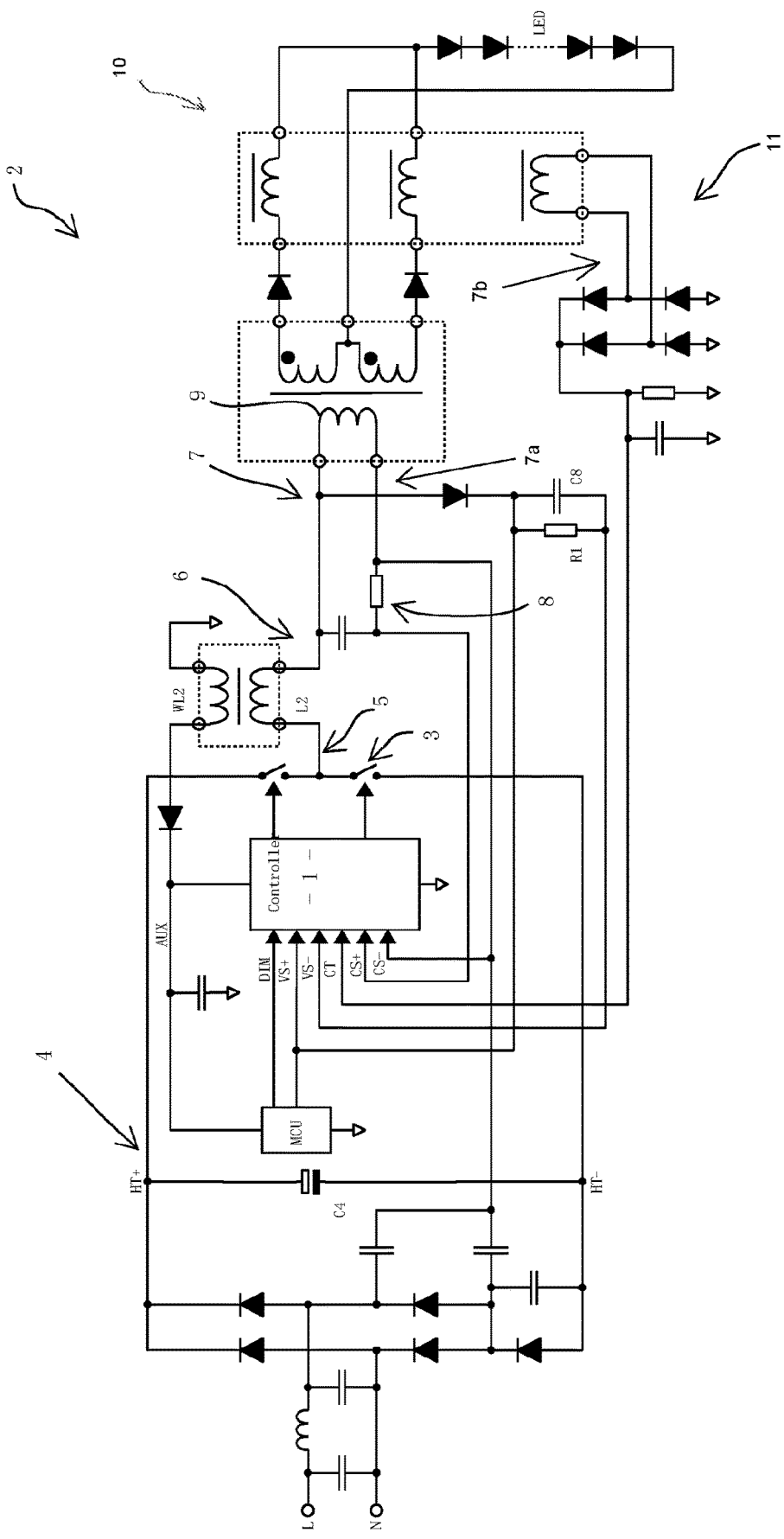
Figure 7:
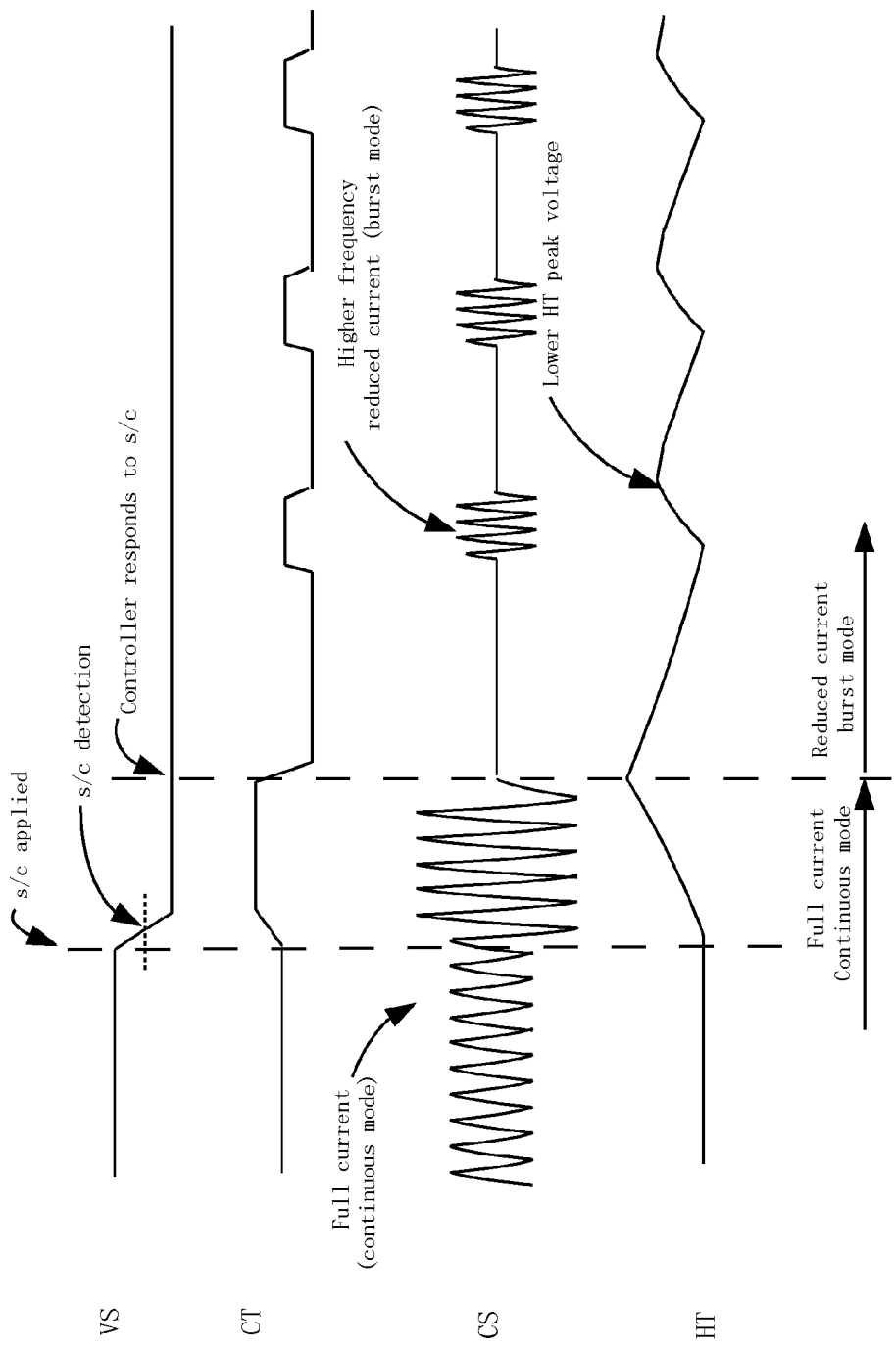
Figure 8:
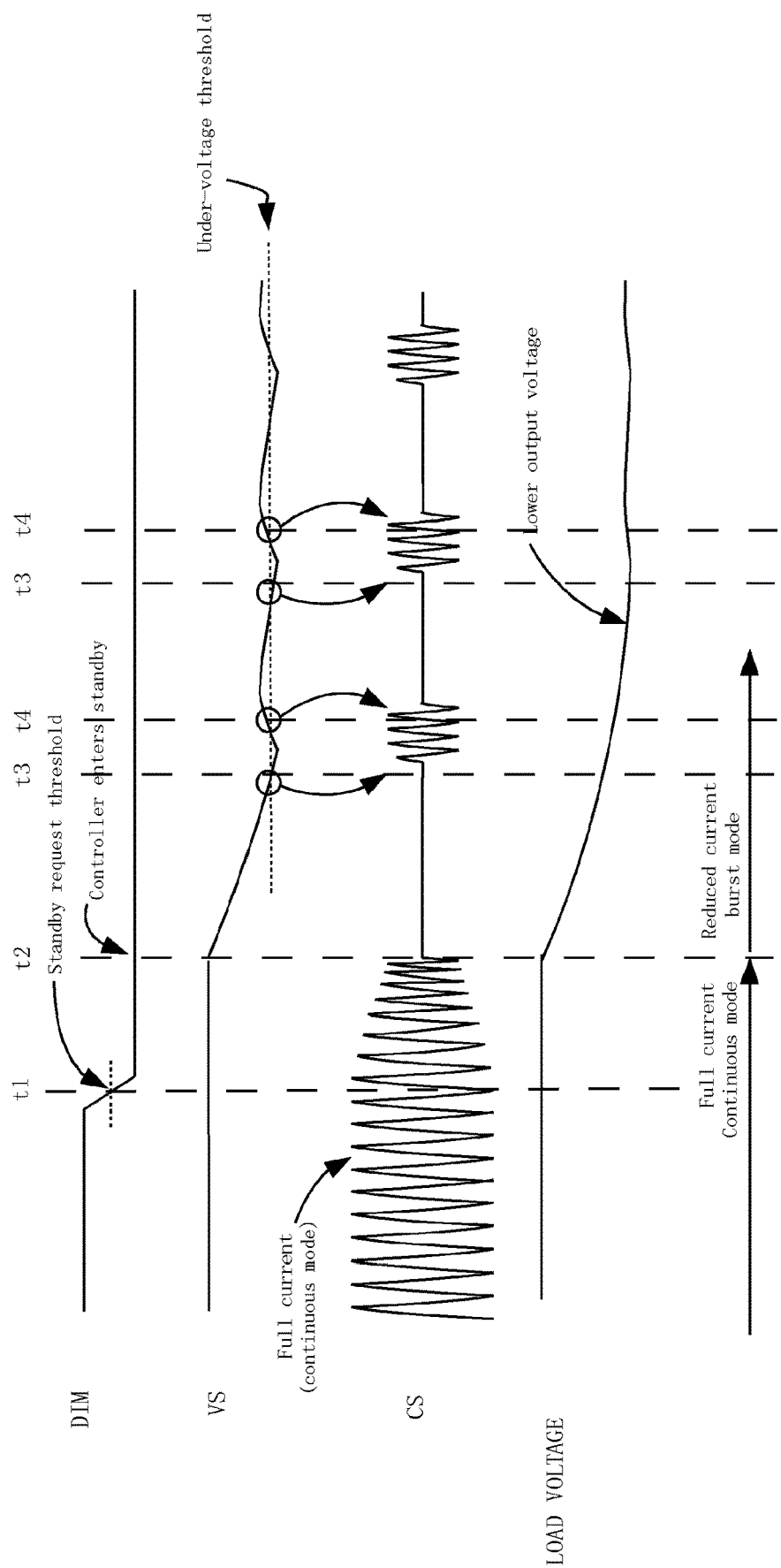
Figure 9:
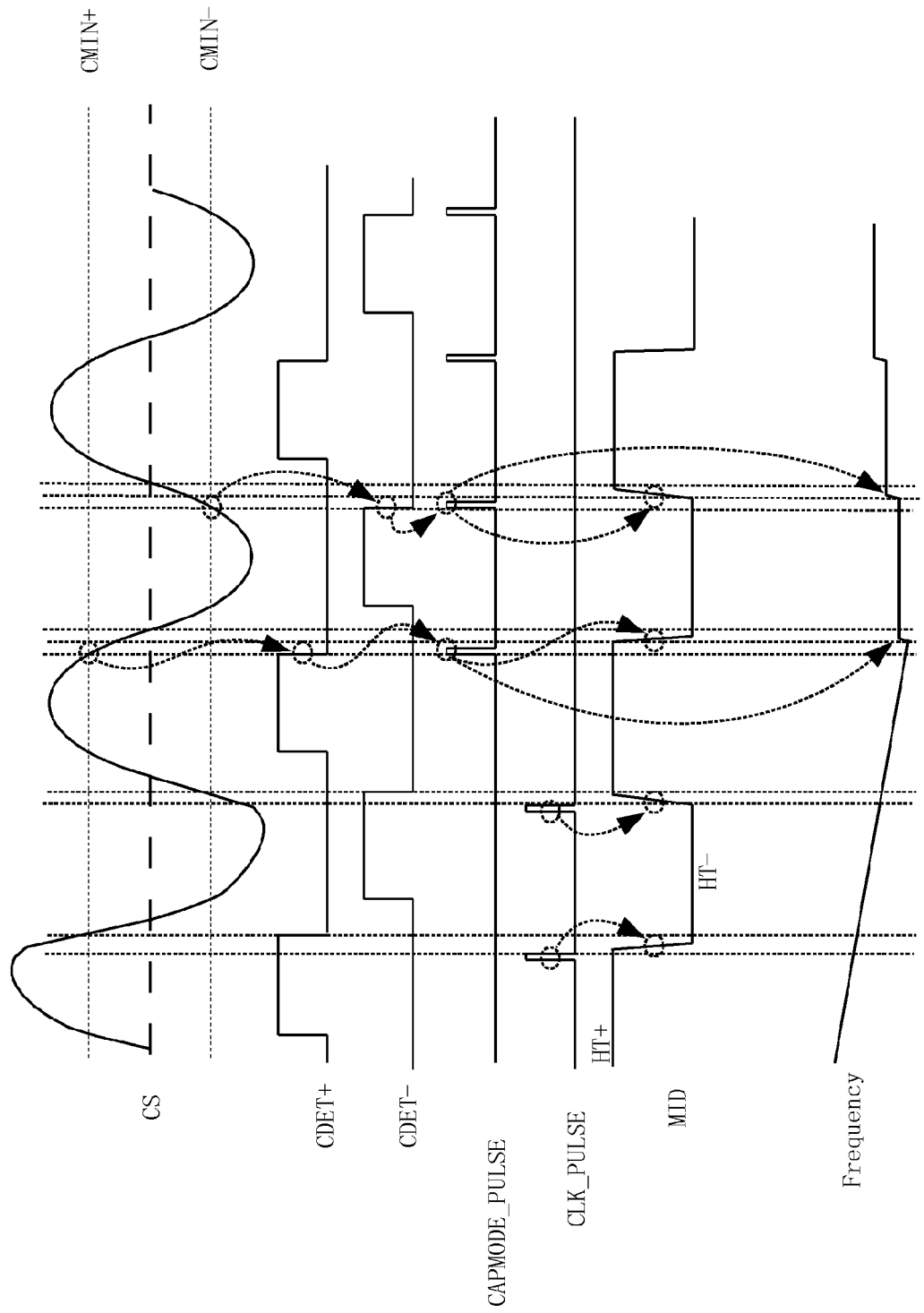
Figure 10:
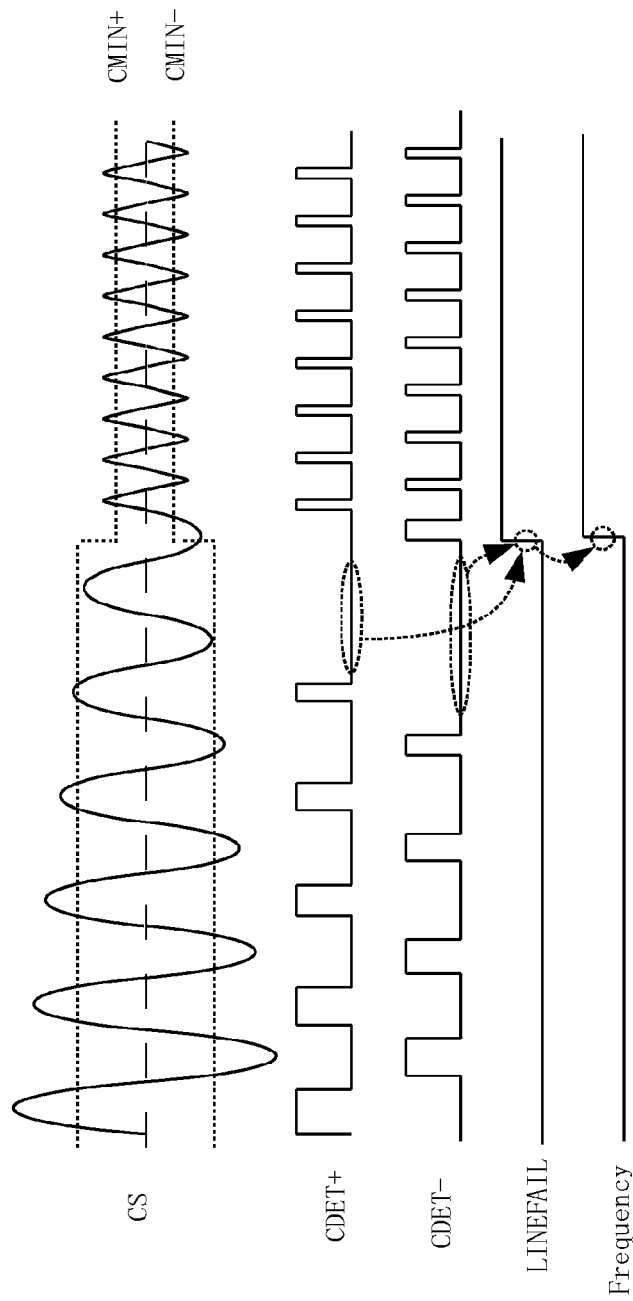

Preferred embodiments in accordance with the best mode of the present invention will now be described, by way of example only, with reference to the accompanying figures listed below, in which the same reference numerals, names, or other reference labels refer to like parts throughout the figures listed below unless otherwise specified, and in which:

FIG. 3 is a schematic diagram of a power converter with a controller in accordance with an embodiment of the present invention, in which the power converter is in the form of a dimmable LED driver with a passive power factor correction (PPFC) circuit;

FIG. 4 is a schematic diagram of a power converter with a controller in accordance with another embodiment of the present invention, in which the power converter is in the form of a dimmable LED driver with an active power factor correction (APFC) circuit;

FIG. 5 is a schematic diagram of a power converter with a controller in accordance with another embodiment of the present invention, in which the power converter is in the form of a LED driver with a passive power factor correction (PPFC) circuit;

FIG. 6 is a schematic diagram of a power converter with a controller in accordance with another embodiment of the present invention, in which the power converter is in the form of a dimmable LED driver with a passive power factor correction (PPFC) circuit;

FIG. 7 are waveforms produced by a power converter with a controller in accordance with an embodiment of the present invention, in which a short-circuit load is imposed;

FIG. 8 are waveforms produced by a power converter with a controller in accordance with an embodiment of the present invention, in which the controller changes from a continuous operating mode to a burst mode in response to a standby request;

FIG. 9 are waveforms produced by a power converter with a controller in accordance with an embodiment of the present invention, in which the controller is performing capacitive-mode switching protection following detection of capacitive-mode switching condition such as during brown-out conditions; and FIG. 10 are waveforms produced by a power converter with a controller in accordance with an embodiment of the present invention, in which the controller is performing a supply disconnection sequence following detection of an interruption to the supply power.

For completeness, the reference numerals, names, or other reference labels indicated in FIGS. 1 and 2, which depict prior art, do not correspond to any of the reference numerals, names, or other reference labels indicated in the remaining figures, which depict embodiments of the present invention.

BEST MODE FOR CARRYING OUT THE INVENTION cl Best Mode

With reference to FIGS. 3 to 10, there is provided a controller 1 for a power converter 2. The power converter 2 comprises an inverter 3 for receiving a supply power 4 and providing an inverter output 5 at an inverter frequency. There is a primary inductance L2 for receiving the inverter output 5 and providing a primary output 7. There is at least one current sensor (such as tank current sensor 8 and/or secondary current sensor 11 described below) for sensing at least one output current and providing at least one output current signal (such as CS and/or CT described below) based on the at least one output current. The controller 1 is adapted to receive the at least one output current signal, and control the inverter frequency by providing a switch control signal SW to the inverter 3 based on the at least one output current signal and a reference signal thereby providing a desired primary output 7 corresponding to the reference signal.

The reference signal can be a fixed reference signal, with the desired primary output 7 thereby being a fixed (that is, constant) primary output. The reference signal can also be a variable dimming signal DIM, with the desired primary output 7 thereby being a dimming primary output. In applications where the power converter 2 drives a light emitting diode (LED) or a LED lighting system, having a reference signal that is a variable dimming signal allows dimming of the LED or LEDs, that is, allows the LED or LEDs to be controlled to emit variable lighting levels.

The primary inductance L2 is typically part of a resonant tank 6, with the resonant tank 6 receiving the inverter output 5 and providing a resonant output as the primary output 7. The resonant tank 6 has a tank current 7a, and at least one of the output currents can be the tank current 7a with at least one of the output current signals being a tank current signal CS based on the tank current 7a. There can be a current sensor in the form of a tank current sensor 8 to detect the tank current 7a and providing the tank current signal CS.

The controller 1 is adapted to receive an auxiliary power supply AUX. The power converter 2 comprises a second auxiliary winding WL2 inductively coupled to the primary inductance L2, with the second auxiliary winding WL2 thereby providing the auxiliary power supply AUX. In addition to, or instead of, this solution for providing the auxiliary power supply AUX, the power converter 2 comprises a main winding 9 for receiving the primary output 7, and a first auxiliary winding WT1 inductively coupled to the main winding 9, with the first auxiliary winding WT1 thereby providing or forming part of the auxiliary power supply AUX.

Having the auxiliary power supply AUX allows the controller 1 to be adapted to receive the auxiliary power supply AUX to remain in an operating state whilst controlling the inverter frequency such that the primary output 7 has a maximum voltage below a load turn-on voltage when the controller 1 receives a load turn-off instruction. In one example, the power converter 2 is a driver for an LED lighting system controlled by a Digital Addressable Lighting Interface (DALI), that is, the load is one or more LEDs. When a load turn-off instruction or condition is issued through the DALI, the controller 1 increases the inverter frequency to a sufficiently high frequency to result in a decreased maximum voltage for the primary output 7 that is below the turn-on voltage for the LEDs. Accordingly, this turns off the LEDs. In doing so, the controller 1 still receives the auxiliary power supply AUX to remain in an operating state.

The controller 1 is also adapted to detect when the auxiliary power supply AUX exceeds a maximum auxiliary supply voltage, and is adapted to enter a standby mode when the auxiliary power supply AUX exceeds the maximum auxiliary supply voltage. This results in clipping the auxiliary power supply AUX and acts to fine tune or enhance the control of the auxiliary power supply AUX by the controller 1.

The power converter 2 comprises an output circuit 10 for receiving the primary output 7. The output circuit 10 has a secondary current 7b, and at least one of the output currents can be the secondary current 7b with at least one of the output current signals being a secondary current signal CT based on the secondary current 7b. This allows the fine-tuning or enhancing of the control of the inverter frequency by the controller 1. For example, the output circuit 10 comprises a current sensor 11 (secondary current sensor) for sensing the secondary current 7b and providing the secondary current signal CT to the controller 1, and the controller 1 is adapted to also use the output current signal CT to control the inverter frequency. This allows the controller 1 to control the inverter frequency by providing the switch control signal SW to the inverter 3 based on the reference signal and either or both of the tank current signal CS and the secondary current signal CT, thereby providing the desired resonant output corresponding to the reference signal.

The power converter 2 can include one or more current sensors, including one or both of the tank current sensor 8 and the secondary current sensor 11. It is therefore appreciated that the at least one output current generally referred to above can refer to either or both of the tank current 7a or the secondary current 7b depending on the context. Accordingly, the at least one output current signal generally referred to above can refer to either or both of the tank current signal CS and the secondary current signal CT depending on the context. The controller 1 can control the inverter frequency by providing the switch control signal SW to the inverter 3 based on the reference signal and one or more output current signals, such as tank current signal CS and secondary current signal CT.

The output circuit 10 is connected to the remainder of the power converter 2 via transformer T1. As such, the output circuit 10 is isolated from the remainder of the power converter 2 and can be referred to as a secondary circuit whilst the remainder of the power converter 2 can be referred to as the primary circuit. In other embodiments, however, the output circuit 10 is not isolated from the remainder of the power converter 2 and can be directly connected to the remainder of the power converter 2.

The controller 1 is adapted to control the inverter frequency to a maximum level during an initialization period to minimize an output current when the controller 1 receives a load turn-on instruction. In applications where the power converter 2 is a driver for a lighting system, this avoids or ameliorates flash at start-up after a turn-on instruction is received. Flash at start-up is where the lighting system emits a high lighting level at start-up which may cause discomfort for occupants. By controlling the inverter frequency to a maximum level during the initialization period, the output current is throttled to zero or a minimum to avoid or ameliorate flash at start-up.

The controller 1 can also be adapted to increase the inverter frequency if a capacitive-mode switching condition is detected. This can be implemented by including a capacitive-mode switching detector in the controller 1. This protects the power converter 2 and/or the load connected to the power converter 2 if a fault occurs.

The controller 1 can also be adapted to increase the inverter frequency if an interruption to the supply power 4 is detected. For example, the supply power can be interrupted if it is cut, damaged, or switched off. In these situations, increasing the inverter frequency reduces, minimizes, or prevents power being supplied by the power converter 2 to a load connected to the power converter 2. This power is then preserved for the auxiliary power supply AUX to keep the controller 1 operating for longer, or is stored in capacitive components, such as C4, or other storage components in the power converter 2. The controller 1 can include a supply disconnection detector to detect an interruption to the supply power 4.

In addition, or alternatively, the controller 1 is adapted to enter a burst mode if an interruption to the supply power 4 is detected. In burst mode, the controller 1 alternates between an operating mode and either a standby or off mode. This also acts to preserve power in the event of an interruption to the supply power 4.

The controller 1 can be adapted to increase the inverter frequency if an under-voltage condition is detected. The controller 1 can also be adapted to enter a standby mode if an over-voltage condition is detected. These avoid or help to mitigate voltage stress on components such capacitive component C4 shown in the figures. The controller 1 can include an internal block in the form of an under-voltage detector to detect an under-voltage condition, and an internal block in the form of an over-voltage detector to detect an over-voltage condition (see below).

Preferably, the power converter 2 has a controlled self-oscillating topology, and the controller 1 is adapted to restart normal oscillation if abnormal oscillation is detected. Put another way, this allows the power converter 2 to be "jump-started" if abnormal oscillation occurs. The controller 1 can include an abnormal self-oscillation detector to detect abnormal oscillation (see below).

Embodiments of the present invention can be in the form of the controller 1 as described above, in the form of the power converter 2 as described above, or in any other apparatus or device that includes the controller 1 as described above. For example, embodiments of the present invention can be in the form of a LED lighting apparatus comprising the power converter 2 as described above which in turn comprises the controller 1 as described above. In one embodiment, the power converter 2, which comprises the controller 1, is a driver that drives one or more LEDs (as a load) in the LED lighting apparatus.

Embodiments of another aspect of the present invention provide a method of controlling a power converter 2. The power converter 2 comprises an inverter 3 for receiving a supply power 4 and providing an inverter output 5 at an inverter frequency. The power converter 2 has a primary inductance L2 for receiving the inverter output 5 and providing a primary output 7. There is at least one current sensor (such as tank current sensor 8 and/or secondary current sensor 11) for sensing at least one output current and providing at least one output current signal (such as CS and/or CT) based on the at least one output current. The method of these embodiments of the invention comprises receiving the at least one output current signal, and controlling the inverter frequency by providing a switch control signal SW to the inverter 3 based on the at least one output current signal and a reference signal thereby providing a desired primary output 7 corresponding to the reference signal.

The primary inductance L2 can be part of a resonant tank 6, with the resonant tank 6 receiving the inverter output 5 and providing a resonant output as the primary output 7. The resonant tank 6 has a tank current 7a, and at least one of the output currents can be the tank current 7a with at least one of the output current signals being a tank current signal CS based on the tank current 7a. There can be a current sensor in the form of a tank current sensor 8 to detect the tank current 7a and providing the tank current signal CS.

The power converter 2 can comprise an output circuit 10 for receiving the primary output 7. The output circuit 10 has a secondary current 7b, and at least one of the output currents can be the secondary current 7b with at least one of the output current signals being a secondary current signal CT based on the secondary current 7b.

The power converter 2 can include one or more current sensors, including one or both of the tank current sensor 8 and the secondary current sensor 11. It is therefore appreciated that the at least one output current generally referred to above can refer to either or both of the tank current 7a or the secondary current 7b depending on the context. Accordingly, the at least one output current signal generally referred to above can refer to either or both of the tank current signal CS and the secondary current signal CT depending on the context. The controller 1 can control the inverter frequency by providing the switch control signal SW to the inverter 3 based on the reference signal and one or more output current signals, such as tank current signal CS and secondary current signal CT.

Other embodiments and features of the method are clear from the foregoing description, including the description in respect of the controller 1.

The controller 1 and associated method of controlling a power converter are well-suited to power converters that act as drivers for one or more LEDs or LED lighting apparatus or systems. In particular, the controller 1 and associated method are well suited to controlling power controllers in the form of dimmable LED drivers, especially those based on resonant power converters using passive power factor correction (PPFC) in standby-capable and network-capable applications.

Considering the figures now in greater detail, FIG. 3 is a simplified block schematic diagram which shows an example of the invention embodied in a half-bridge resonant power converter 2. The resonant tank 6 typically has a series inductor-capacitor (LC) or a series-shunt inductor-capacitor-capacitor (LCC) topology as shown in FIG. 3, but other resonant topologies can be used, depending on the application requirements. For simplicity, a single stage PPFC block is shown, but a dual boost PPFC block could also be used (see, for example, FIGS. 5 and 6), allowing the power factor and harmonics emissions to be compliant over a wider range of supply and load. A transformer T1 provides load isolation and voltage transformation, but this could be omitted to save costs for a non-isolated application.

For typical LEDs, such as those used in lighting panels, the voltage applied to the LED in the off-state must be less than approximately 63% of the full-current on-state voltage to ensure that the LED is completely off. To ensure that the auxiliary power supply AUX is maintained independently of LED illumination, the auxiliary power supply AUX is supplied by rectifying the output from two auxiliary windings WT1 and WL2, with one auxiliary winding WT1 on the main transformer T1 and the other auxiliary winding WL2 on the tank inductance in the form of resonant inductor L2. In FIG. 3, the two auxiliary windings WT1 and WL2 are connected in series and the output rectified by a single rectifier. The auxiliary power supply AUX thus provides a supply voltage that is the arithmetic sum of the two auxiliary windings WT1 and WL2 (scaled by their respective turns ratios). This arrangement provides an auxiliary power supply AUX voltage which is relatively independent of LED voltage and current.

In FIG. 4, the two auxiliary windings WT1 and WL2, and rectifiers D2 and D3 are arranged in a parallel connection. Under normal conditions, when the LED is being illuminated, the auxiliary power supply AUX rail will be maintained by the auxiliary winding WT1 on the transformer T1, because the voltage on winding WT1 is higher than the voltage on winding WL2. If the driver (i.e. power converter 2) is running in the LED off-mode (i.e. with the LED off, but the power converter 2 operational), the voltage on winding WT1 will be lower than on winding WT2, so that the auxiliary power supply AUX rail will be maintained by winding WT2 on the series-resonant inductor L2 (i.e. primary inductance L2).

The schematic in FIG. 6 shows the auxiliary power supply AUX is provided by the inductor auxiliary winding WL2 alone.

The controller 1 interfaces with four signals: VS (voltage sense); CS (tank current signal, or otherwise referred to as "primary current sense"); CT (secondary current signal, or otherwise referred to as "load current sense"); DIM (variable dimming signal, or otherwise referred to as "dim control input"). Two of these signals, CS and DIM, also interface to a master control unit (MCU).

The variable dimming signal DIM can be an input or bidirectional, being normally configured as an input to the controller 1. The DIM signal is supplied by the MCU to set the internal dim reference for the current control loop. However, the controller 1 is also capable of forcing the DIM signal to a pre-defined dim reference level when required, such as during system start-up when the MCU outputs may be undefined.

The VS signal can be an input or bidirectional. Normally, the VS signal is an input to the voltage control loop, being derived from the supply transformer auxiliary winding WT1 and thus representing a scaled and reflected form of the load voltage.

The tank current signal CS is an AC input, representing the current in the transformer primary winding 9 and therefore substantially representing, in scaled form, the AC current to the load. The CS signal is provided to the current control loop and the capacitive-mode switching detection controlled by the controller 1.

The secondary current signal CT is typically an optional input, representing, in scaled form, the load current from the output circuit 10. Where implemented, the CT signal is used by the controller 1 in the current control loop, instead of or in addition to the CS signal, to achieve higher accuracy.

The switch control signal SW is an output to the inverter 3 to control the inverter switching frequency. Under normal supply and load conditions, the SW signal is controlled by either the voltage control loop or the current control loop, whichever of these is limiting (and therefore demanding the highest frequency) so that the LED driver (i.e. power converter 2) has a CC/CV output characteristic.

Embodiments of the controller 1 can have one or more of the following internal blocks.

The controller 1 can include a current control loop to amplify the difference between the sensed load current and an internal dim reference level to produce an output current control signal. The internal dim reference signal can be a fixed value (as in non-dimmable LED drivers) or a variable value such as variable dimming signal DIM (as in dimmable LED drivers). The sensed load current can be provided by the CS signal (to achieve the minimal cost) or optionally by the CT signal (to achieve the best accuracy).

The controller 1 can include a voltage control loop to amplify the difference between a load voltage sense signal VS and a voltage reference to produce an output voltage control signal.

The controller 1 can include an under-voltage detector which detects when the VS signal is below a pre-defined low threshold. In continuous operation, this indicates that the load voltage is abnormally low, such as at start-up or when the load is a short-circuit.

The controller 1 can include an over-voltage detector which detects when the VS signal is above a first high threshold. Preferably, the first high threshold is slightly higher than the voltage reference used by the voltage control loop.

If the voltage on VS rises above a second high threshold (this being substantially higher than the first high threshold used by the over-voltage detector), the condition is detected by a reset request detector in the controller 1, which then resets the controller 1, that is, re-initialises the control loops, clears internal registers, etc.

The controller can include a frequency limiter to keep the switching frequency within a maximum and a minimum limit. Preferably, the ratio of maximum frequency to minimum frequency and available frequency range is approximately 7:1.

The controller 1 can include a standby request detector which can force the controller 1 into standby mode if the DIM signal is below a predefined DIM threshold and the VS signal is within the normal range (i.e. between said under-voltage and over-voltage thresholds).

The controller 1 can include a capacitive-mode switching detector to detect capacitive-mode switching. The tank current is monitored by two comparators, producing two timing signals. Referring to FIG. 9, the tank current sense (tank current signal CS) is shown to be approaching resonance. The comparators compare the CS signal against two thresholds, CMIN+ and CMIN− producing the signals CDET+, CDET− respectively. Capacitive-mode switching is detected if the falling edges of CDET+, CDET− occur before the end of the relevant clock cycle, indicated by the signal CLK_PULSE and producing the signal CAPMODE_PULSE.

The controller 1 can also include a supply disconnection detector. As for the capacitive-mode switching detector, the tank current is monitored by two comparators which compare the CS signal against two thresholds, CMIN+ and CMIN−. FIG. 10 shows the tank CS signal after a supply disconnection, reducing in amplitude as the HT supply is discharged. The CS waveform shrinks until the CDET+ and CDET− pulses disappear, at which point the controller detects a supply disconnection.

An alternative method for detecting supply disconnection can be implemented using an external sensing circuit which monitors the supply input or the HT voltage to provide a status signal to the MCU.

For power converters 2 with self-oscillating topologies, the controller 1 can include a detector for detecting abnormal self-oscillation, such as super-harmonic oscillation, subharmonic oscillation or complete absence of oscillation. When such a condition is detected, the controller 1 can restart or attempt to restart proper oscillation by issuing a sequence of start pulses, thereby "jump-starting" the power converter 2.

Embodiments of the controller 1 have many advantageous features and functionality, some of which are described in further detail below.

Constant Current Control

Where the power converter 2 serves as a dimmable LED driver, the internal dim reference level is normally set by the DIM signal from the MCU. However, there are several conditions in which the DIM signal is ignored, which include: low load voltage (detected by the under-voltage detector); low frequency (detected by the frequency limiter); capacitive-mode switching (indicated by the capacitive-mode switching detector). Under any of these conditions, the internal dim reference level is set to a pre-defined dim level and the external DIM signal is ignored. Typically, the current control loop comprises one or more integrators with associated phase compensation components. A capacitive-mode switching detector can temporarily modify the current control loop characteristics (e.g. reduce the gain, increase the phase compensation) in brown-out conditions.

Start-up

When power is first applied, the MCU is uninitialized, so that the outputs are tri-stated (i.e. high impedance). The controller 1 initialises the DIM signal by pulling it to a zero value for a pre-defined initialisation period. Internally, the internal dim reference used by the current control loop may be set to a low or zero value, so that the controller 1 runs the inverter 3 at high or maximum frequency. Once the initialisation period has elapsed, the DIM pull-down is removed allowing the MCU to set the required dim level. This start-up sequence keeps the load voltage at a minimum, to avoid a premature flash on the LED.

Output S/C Protection

If an under-voltage condition is detected, the controller 1 can increase the switching frequency to reduce both the HT rail boosting and the load current. The controller 1 can achieve this by simply forcing the frequency to a predefined higher value. Alternatively, and preferably, the controller 1 can reduce the internal dim reference used by the current control loop (effectively ignoring the external DIM signal) so that the CC control loop regulates for a lower load current, which has the effect of increasing the switching frequency. Additionally, the controller 1 can operate in a burst mode (described below) when an output short-circuit is detected, which reduces not only the peak HT voltage, but also the power drawn from the supply input and dissipated in the power components. FIG. 7 shows the relevant waveforms of the controller 1 responding to an imposed short-circuit by increasing the frequency and entering burst mode.

Output Over-Voltage Protection

If an over-voltage condition is detected, the controller 1 can enter a standby mode, to prevent exacerbating the over-voltage condition. The controller 1 can resume operation when the output voltage indicated by the VS signal has dropped below the over-voltage threshold. Where the initial cause of the over-voltage condition persists, the controller 1 can enter a burst mode through repeating the sequence just described.

Capacitive-mode Switching Protection

If capacitive-mode switching is detected, the controller 1 can temporarily reduce the reference value of the current control loop, so that the control loop increases the frequency to be further away from the series-resonant frequency of the resonant tank 6. This action avoids consecutively repeated capacitive-mode switching events from occurring on the subsequent cycles. The controller 1 can also temporarily reduce the loop gain and phase compensation of the current control loop to improve response and stability.

Burst Mode

The controller 1 can include a burst mode, in which the inverter 3 alternates between a standby mode (in which the controller 1 output SW is deactivated, halting the inverter 3 so that no power is converted) and an operating mode. The timing of the bursts can be controlled by the controller 1 itself or by an external MCU via the DIM and/or VS input signals.

Burst Mode to Protect Against Output Over-Voltage

If the voltage on VS rises above a first high threshold, an over-voltage condition is detected by the over-voltage detector and the controller 1 enters a standby mode. The voltage of VS then drops at a rate determined by the time constant of external components (for example, R1 and C8 in the figures) until the VS signal drops below the over-voltage threshold, when the over-voltage detector releases the controller 1 to restart power conversion through the power converter 2. If the pre-existing cause of the over-voltage is still present, the sequence repeats until the pre-existing cause of the over-voltage is removed.

PWM Burst Mode

The MCU can request standby by driving the DIM input below a standby request threshold (detected by the standby request detector) and the controller 1 can respond by entering a standby mode. The MCU can alternate the DIM input between some finite value and zero to implement dimming using a pulse-width modulation (PWM) method.

MCU-Controlled Standby and Reset

The controller 1 can also be controlled by an external MCU acting as a master by communicating through the VS signal. Preferably, the MCU can force the VS signal above the over-voltage threshold, as described above, putting the controller 1 into a standby mode. Additionally, by forcing the VS signal to the reset request threshold (which is higher than the over-voltage threshold) the MCU can re-initialise the controller 1 (i.e. re-initialise the control loops, clear internal registers, etc).

Using Burst Mode to Maintain the Controller Supply in DALI Off-Mode

To maintain the controller supply in a standby condition (i.e. while the LED is off), a burst mode is controlled by the VS and DIM signals as follows. The external MCU can signal a standby request by driving the DIM input below a pre-defined threshold, causing the controller 1 to enter a standby mode, provided there is no under-voltage condition detected. Referring to FIG. 7, the VS signal can be derived by rectifying the voltage of the auxiliary winding WT1 on to capacitor C8. When the power converter 2 is running, VS reflects the load voltage, but when the power converter 2 is in a standby mode, VS falls at a rate defined by the product of R1 and C8 values, so that eventually a false under-voltage condition is detected. In this way, the controller 1 exits the standby mode and resumes operation briefly until the VS signal is raised above the under-voltage threshold. Appropriate selection of values for R1, C8 and the under-voltage detection threshold provides a simple means of controlling the burst timings. Referring to the example waveforms in FIG. 8, at t1 the MCU drives the DIM input voltage below a threshold, signalling a standby request. At t2, the controller 1 responds by entering a standby mode. At t3, the voltage of VS falls below the under-voltage threshold, when the under-voltage detector forces the controller 1 to resume running again. At t4, the voltage of VS rises above the under-voltage threshold again, allowing the controller 1 to re-enter the standby mode.

An alternative arrangement is possible which allows the MCU to control the timings directly. In this case, the MCU forces the VS input below the under-voltage detection threshold (to initiate the burst) and later releases the VS input (to terminate the burst).

Supply Disconnection Sequence

When the supply disconnection detector detects an interruption to the supply power 4 (supply disconnection condition), a supply disconnection sequence is initiated, which can include the following steps. The internal dim reference level can be set to a low value in order to increase the frequency and reduce the output current and thereby conserve energy stored in the HT capacitor. The controller 1 can enter a burst mode to further conserve energy stored in the HT capacitor. The threshold levels of the capacitive-mode switching detector can be reduced to maintain zero-voltage switching. The supply disconnection condition can be communicated to the MCU by driving to the VS or DIM signal. The MCU can then follow the DALI turn-off sequence described above to extinguish the LED and conserve HT energy, thereby maximising the time available to communicate with the network controller and complete an orderly shutdown.

It is appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it is appreciated by those skilled in the art that the invention can be embodied in many other forms. It is also appreciated by those skilled in the art that the features of the various examples described can be combined in other combinations. In particular, it is appreciated by those skilled in the art that there are different variations of the circuits described above within the scope of the present invention. There are many possible permutations of the circuit arrangements described above which are appreciated by those skilled in the art. Accordingly, the circuit components shown in the embodiments can be interchanged freely, placed in different arrangements or order, but still provide the functionality described in respect of the circuit as originally arranged or ordered in the described embodiments, and therefore, still falling within the scope of the present invention.

The invention claimed is:

1. A controller for a power converter, the power converter comprising:
an inverter for receiving a supply power and providing an inverter output at an inverter frequency;
a primary inductance for receiving the inverter output and providing a primary output;
at least one current sensor for sensing at least one output current and providing at least one output current signal based on the at least one output current;
a main winding for receiving the primary output;
an auxiliary winding for providing an auxiliary power supply wherein said auxiliary winding is selected from a group including a first auxiliary winding inductively coupled to the main winding and a second auxiliary winding inductively coupled to the primary inductance;
the controller that:
receives the at least one output current signal;
controls the inverter frequency by providing a switch control signal to the inverter based on the at least one output current signal and a reference signal thereby providing a desired primary output corresponding to the reference signal; and
receives the auxiliary power supply from the auxiliary winding.

2. The controller according to claim 1 wherein the reference signal is a fixed reference signal, the desired primary output thereby being a fixed primary output.

3. The controller according to claim 1 wherein the reference signal is a variable dimming signal, the desired primary output thereby being a dimming primary output.

4. The controller according to claim 1 wherein the primary inductance is part of a resonant tank, the resonant tank receiving the inverter output and providing a resonant output as the primary output.

5. The controller according to claim 4 wherein the resonant tank has a tank current, wherein said at least one output current is the tank current and said at least one output current signal is a tank current signal based on the tank current.

6. The controller according to claim 1 wherein the controller receives the auxiliary power supply to remain in an operating state whilst controlling the inverter frequency such that the primary output has a maximum voltage below a load turn-on voltage when the controller receives a load turn-off instruction.

7. The controller according to claim 1 wherein the controller detects when the auxiliary power supply exceeds a maximum auxiliary supply voltage, and the controller enters a standby mode when the auxiliary power supply exceeds the maximum auxiliary supply voltage.

8. The controller according to claim 1 wherein the power converter comprises an output circuit for receiving the primary output, the output circuit having a secondary current, wherein said at least one output current is the secondary current and said at least one output current signal is a secondary current signal based on the secondary current.

9. The controller according to claim 1 wherein the controller controls the inverter frequency to a maximum level during an initialization period to minimize an output current when the controller receives a load turn-on instruction.

10. The controller according to claim 1 wherein the controller increases the inverter frequency if a capacitive-mode switching condition is detected.

11. The controller according to claim 1 wherein the controller increases the inverter frequency if an interruption to the supply power is detected.

12. The controller according to claim 1 wherein the controller enters a burst mode if an interruption to the supply power is detected.

13. The controller according to claim 1 wherein the controller increases the inverter frequency if an under-voltage condition is detected.

14. The controller according to claim 1 wherein the controller enters a standby mode if an over-voltage condition is detected.

15. The controller according to claim 1 wherein the power converter has a controlled self-oscillating topology, and wherein the controller restarts normal oscillation if abnormal oscillation is detected.

16. A power converter comprising a controller according to claim 1.

17. An LED lighting apparatus having a power converter comprising a controller according to claim 1.

* * * * *